(12) United States Patent
Hashem

(10) Patent No.: US 6,767,035 B2
(45) Date of Patent: Jul. 27, 2004

(54) HIGH TORQUE MODIFIED PROFILE THREADED TUBULAR CONNECTION

(75) Inventor: Ghazi J. Hashem, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/095,124

(22) Filed: Mar. 11, 2002

(65) Prior Publication Data

US 2003/0168858 A1 Sep. 11, 2003

(51) Int. Cl.[7] .............................................. F16L 15/00
(52) U.S. Cl. ..................... 285/333; 285/334; 285/332.2
(58) Field of Search ................. 285/333, 334, 285/355, 390, 332.2, 332.3, 391, 332, 332.4, 334.1, 334.4

(56) References Cited

U.S. PATENT DOCUMENTS

| | | | |
|---|---|---|---|
| 3,989,284 A | | 11/1976 | Blose ....................... 285/332.2 |
| 4,244,607 A | * | 1/1981 | Blose ........................... 285/334 |
| 4,600,224 A | * | 7/1986 | Blose ........................... 285/334 |
| 4,648,627 A | | 3/1987 | Reimert ......................... 285/24 |
| 4,703,959 A | | 11/1987 | Reeves et al. ............. 285/332.3 |
| 4,707,001 A | | 11/1987 | Johnson .................... 285/332.3 |
| 4,822,081 A | * | 4/1989 | Blose ........................... 285/334 |
| 4,830,411 A | * | 5/1989 | Tsuru et al. ................. 285/334 |
| 4,917,409 A | * | 4/1990 | Reeves ........................ 285/334 |
| 5,360,240 A | * | 11/1994 | Mott ........................... 285/390 |
| 5,415,441 A | | 5/1995 | Kolgore et al. ............. 285/322 |
| 5,427,418 A | | 6/1995 | Watts ........................... 285/94 |
| 5,924,745 A | | 7/1999 | Campbell ...................... 285/90 |
| 5,954,374 A | | 9/1999 | Gallagher et al. ........... 285/332 |
| 5,984,568 A | | 11/1999 | Lohbeck ..................... 403/375 |
| 6,042,153 A | | 3/2000 | DeLange ....................... 285/55 |
| 6,050,610 A | * | 4/2000 | Enderle et al. ............. 285/334 |
| 6,123,368 A | | 9/2000 | Enderle ........................ 285/334 |
| 6,206,436 B1 | * | 3/2001 | Mallis .......................... 285/334 |
| 6,254,146 B1 | * | 7/2001 | Church ........................ 285/334 |
| 6,270,127 B1 | * | 8/2001 | Enderle ........................ 285/334 |
| 6,273,474 B1 | | 8/2001 | DeLange ....................... 285/55 |
| 6,322,109 B1 | | 11/2001 | Campbell et al. ............. 285/92 |

FOREIGN PATENT DOCUMENTS

| | | | |
|---|---|---|---|
| EP | 0 127 560 | 1/1990 | ........... F16L/15/04 |
| EP | 1 106 778 | 6/2001 | ......... E21B/17/042 |
| GB | 2 361 724 | 10/2001 | ........... E21B/43/10 |
| WO | WO 98/42947 | 3/1998 | ........... E21B/17/08 |
| WO | WO 01/04520 | 1/2001 | ............ F16J/15/16 |

OTHER PUBLICATIONS

Scott et al., "VAM–PRO A Premium that cuts Rig Operational Costs," *World Oil*, pp. 103–146 (Oct. 1995).
Scott et al., "2002 Tubing Reference Tables," *World Oil*, pp. T–3–T–10 (Jan. 2002).

* cited by examiner

*Primary Examiner*—David Bochna
(74) *Attorney, Agent, or Firm*—Howrey Simon Arnold & White

(57) ABSTRACT

A threaded pipe connection having box and pin members is provided with inner engageable thread means on the box and pin members, the thread means including a helical dove-tail thread having negative flank angles extending along the lengths of the box and pin members, and a helical intermediate thread having positive flank angles extending along the lengths of the box and pin members adjacent the dove-tail thread. Upon makeup, the intermediate threads generate hoop tension in the box member and hoop compression in the pin member, and the dove-tail threads generate hoop compression in the box member and hoop tension in the pin member.

51 Claims, 5 Drawing Sheets

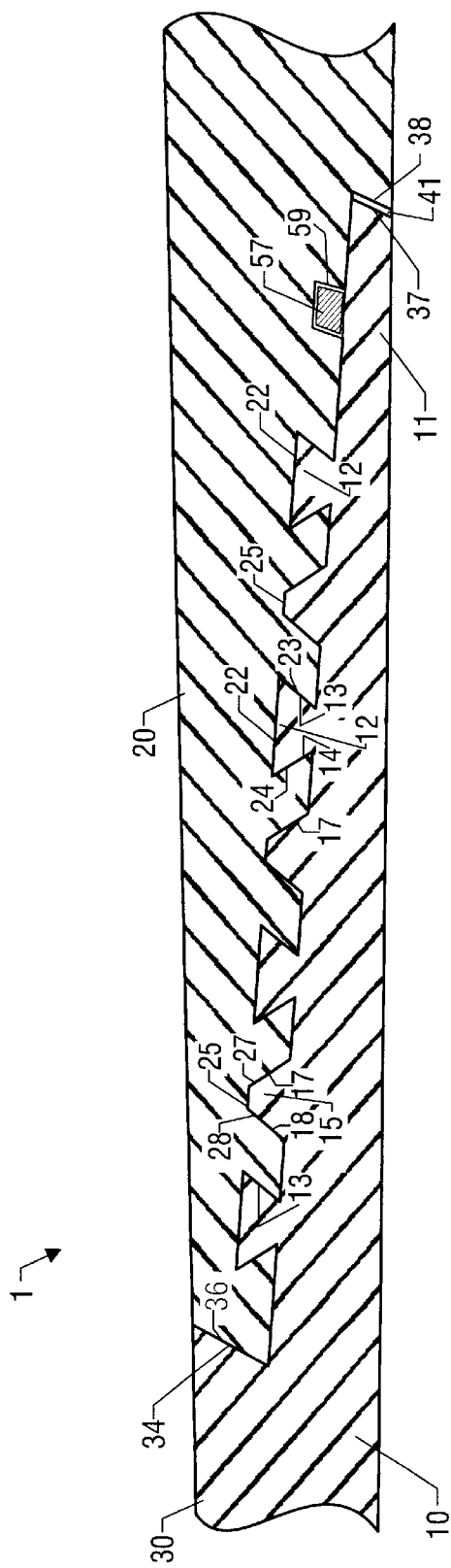
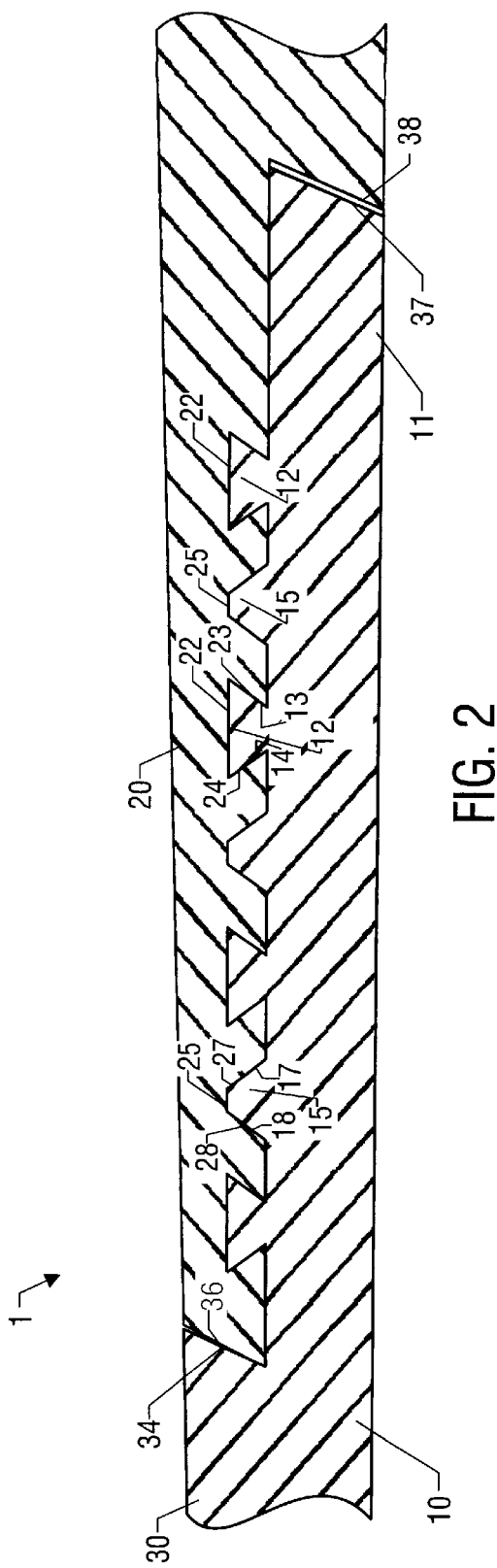

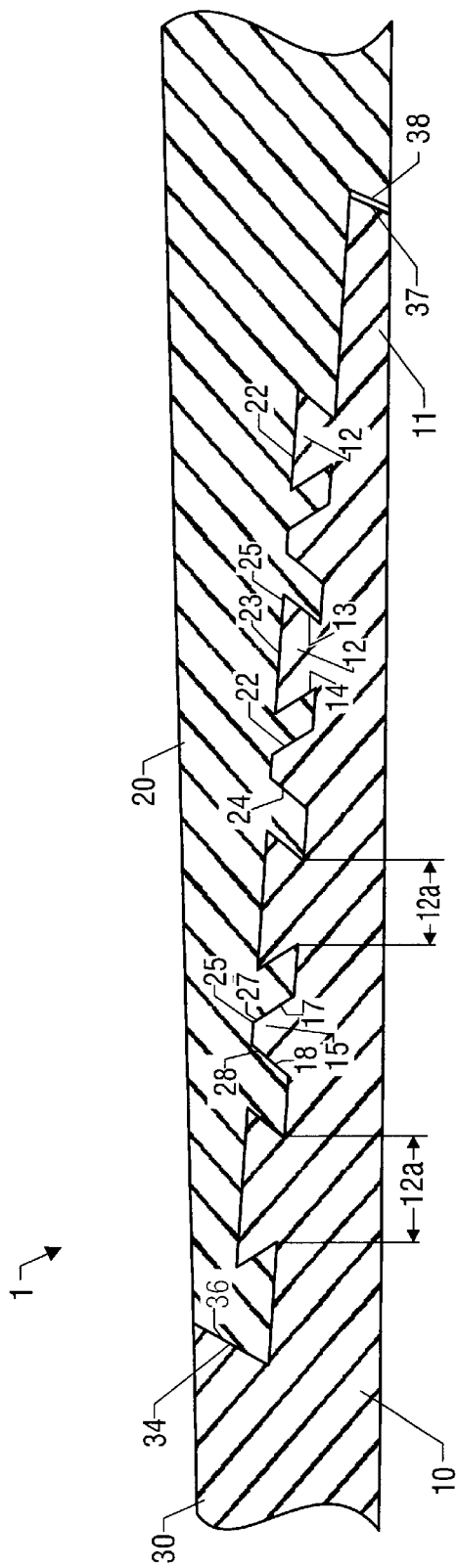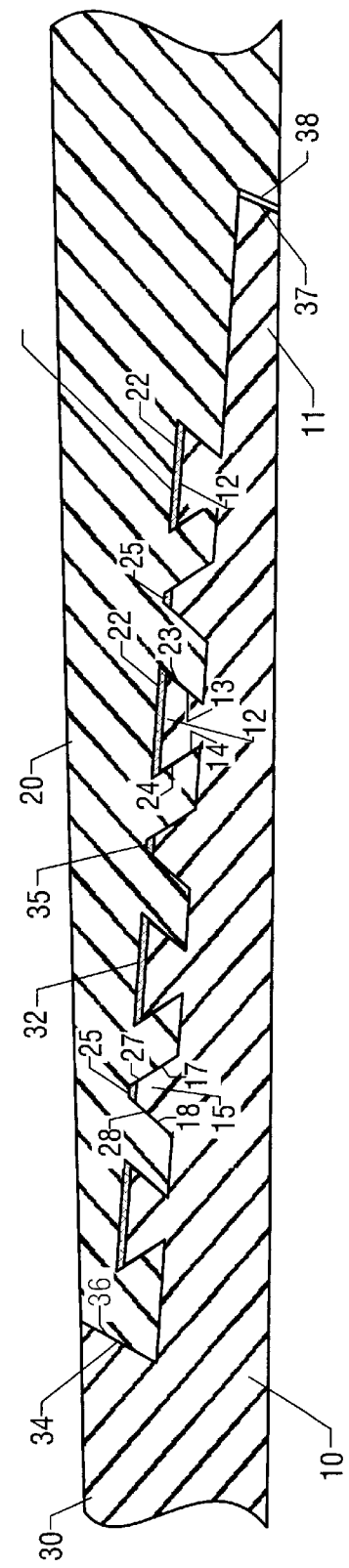

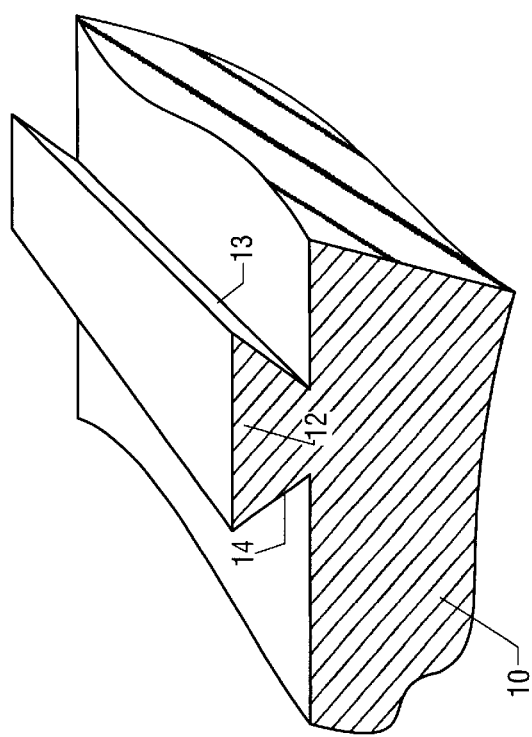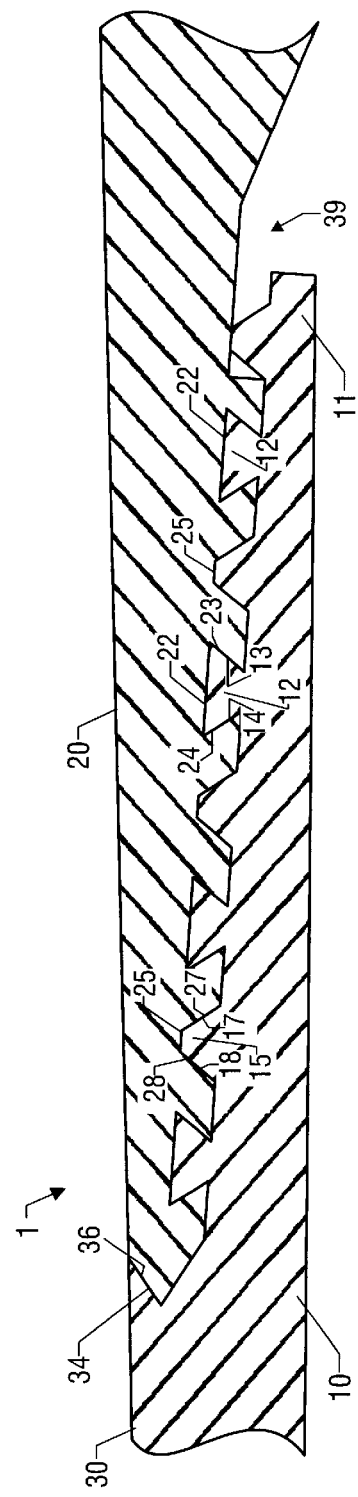

US 6,767,035 B2

HIGH TORQUE MODIFIED PROFILE THREADED TUBULAR CONNECTION

FIELD OF THE INVENTION

The present invention relates to threaded pipe connections particularly useful in the oil and gas industry. In particular, the invention relates to a threaded pipe connection having high torque capacity.

BACKGROUND OF THE INVENTION

High torque capacity is a desired feature in threaded tubular connections that are used in the oil and gas industry. The following are examples of some applications that require connections having high torque capacity.

During the cementing operations such as when setting a liner, operators will often reciprocate the liner axially, while also rotating the liner to produce a better cementing job. To do this, the liner connection must have high torque capacity; otherwise the pin may continue to advance into the box beyond the predetermined axial distance and thus ruin the connection. Workover strings are another example. Many times a tubing workover string is used to drill a small amount of cement. Drilling imparts additional torsional loads on the tubing connections. Again, without sufficient torque capacity, the pin will advance into the box beyond the desired point. There are several threaded tubular connections that are designed specifically for workover operations that require high torque capacity.

Drill pipe tool joints must also have a high torque capacity to perform their job. A tool joint that is not torqued properly or does not have high torque capacity will fail prematurely resulting in lost rig time and an expensive fishing job.

If production tubing connections are wedged correctly and are made up with adequate torque, then the connections will resist backing off when subjected to cyclic loading caused by heating and cooling during production and shut in operations. Flush-joint wash pipe and other types of completion tools, or their components, may also require high torque strength connections for resisting cyclic and/or operational loads.

High torque capacity or strength is inherently built into the design of some connections. Generally, this is accomplished in several ways such as having a connection with a pin having a diameter that is slightly larger than the mating diameter on the box at a certain axial distance, that is to say, when the pin is rotated into the box, it will show a stand off at the hand tight position. This stand off will be eliminated when the pin is made-up into the box by applying adequate torque to the connection. Additional torque capacity is added to the connection by machining strong external or internal shoulders or a combination of both. The shoulders will stop the pin from axially advancing when higher torque is applied. Connections of this type may have trapping angles on the shoulders for containment and for added strength. Some connections depend on a wedge thread design. Others will have a tool joint made out of higher strength material than that of the pipe itself, the tool joint then is threaded or welded into the pipe.

SUMMARY OF THE INVENTION

According to one embodiment of the present invention, a pipe connection having a box member and a pin member with interengageable threads is provided having a first thread which generates hoop tension in the box member and hoop compression in the pin member during make-up of the connection and a second thread adjacent the first thread which generates hoop compression in the box member and hoop tension in the pin member during make-up of the connection. The second thread may have a generally dove-tail shape or may be a hooked thread with a negative load angle. The hooked thread may also have a positive stab angle to facilitate stabbing of the connection. The first thread may be selected from a buttress thread, a round thread, an ACME thread or any other conventional oilfield thread. The first and/or second thread on the pin member may be configured to generate axial wedging with the mating, interengageable thread on the box member. The opposing hoop stresses generated by the first and second threads reduce the combined hoop stress acting on the connection.

One embodiment of the present invention is directed to a threaded pipe connection having box and pin members comprising interengageable thread means on the box and pin members, the thread means including a dove-tail thread having negative flank angles extending along the lengths of the box and pin members and an intermediate thread having positive flank angles extending along the lengths of the box and pin members adjacent the dove-tail thread, wherein the intermediate threads generate hoop tension in the box member and hoop compression in the pin member, and the dove-tail threads generate hoop compression in the box member and hoop tension in the pin member during engagement of the pin member with the box member. Torque is resisted by the radial interference and the opposing forces generated by the two different types of threads on the connection.

Another embodiment of the present invention is directed to a threaded pipe connection comprising a dual threaded pin member having a tapered, external generally dove-tail shaped thread having negative flank angles and a tapered, external intermediate thread having positive flank angles adjacent to the generally dove-tail shaped thread. The connection also has a dual threaded box member having a tapered, internal generally dove-tail shaped mating thread engageable with the dove-tail shaped thread of the pin member and a tapered, internal intermediate mating thread engageable with the intermediate thread of the pin member so that the respective generally dove-tail shaped thread and intermediate thread of the pin member engage the respective mating threads of the box member during rotational makeup of the connection.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 1 is a side view of a tapered threaded pipe joint connection according to one embodiment of the present invention.

FIG. 2 is a side view of a non-tapered threaded pipe joint connection according to one embodiment of the present invention.

FIG. 5 is a side view of an embodiment of the threaded pipe joint connection wherein the width of the dove-tail thread increases in width along the helical length of the pin member.

FIG. 6 is a side view of an embodiment of the threaded pipe joint connection having a radial clearance between the mating crests and grooves of the intermediate and dove-tail threads.

FIG. 7 is a perspective view of a dove-tail thread as shown in FIG. 5 having a gradually increasing width.

FIG. 8 is a side view of a threaded pipe connection according to another embodiment of the present invention.

DESCRIPTION OF ILLUSTRATIVE EMBODIMENTS

Figure 3:
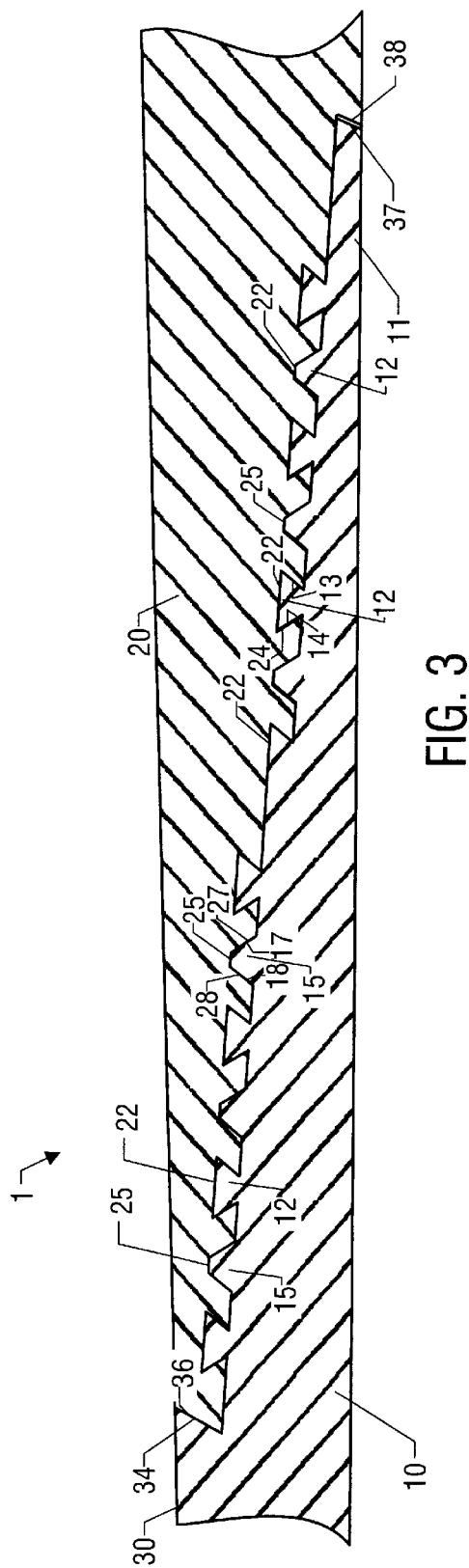
FIG. 3 is a side view of an embodiment of the threaded pipe joint connection having a stepped profile.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Threaded tubular connections that are typically used in the production of oil and gas comprised of pins members that will be stabbed into box members that are designed to receive them. The connections are then made-up by applying torque to the connection. The pin and the box threads of each connection are typically machined on the same taper but the pin's tapered diameter is slightly larger than that of the box. A bearing pressure is generated between the mating surfaces of each pin and each box due to the axial movement of the pin into the box. This causes the pin to push the box radially outward, thus generating tangential hoop tension in the box, while at the same time, the box is pushing the pin inward generating hoop compression in the pin. Other connections have a generally dove-tail shaped thread form such that when the connection is made-up, hoop compression is produced in the box and hoop tension is produced in the pin. U.S. Pat. No. 3,989,284, incorporated herein by reference, is an example of such dove-tail shaped threads.

Generally, threaded connections would have ordinary torque capacity that is typical of such connections. To increase the torque capacity, some of the above mentioned designs will incorporate torque shoulders or wedge thread features. Whenever a wedge thread is used, the connection's torque resistance will be increased since excessive torque will result in axial squeezing on the threads which will prevent the pin from advancing any further in the box. U.S. Pat. No. 3,989,284 discloses an example of threads which utilize this axial wedging feature.

The threaded tubular connection of the present invention differs from other connections in the way the threads are profiled or arranged. Referring now to FIG. 1, a pipe joint 1 includes pin member 10 and box member 20. Interengaged thread means on the box and pin members include helical threads 12 and 15 extending along the length of pin member 10. Box member 20 includes helical mating threads 22 and 25 which are shaped and sized to mate with threads 12 and 15 respectively on pin member 10 during make-up of the connection. Threads 12 and 22 have a generally dove-tail shape and interfit such that during make-up of the box and pin members, flank 13 on thread 12 will engage flank 23 on thread 22, and opposite flank 14 on thread 12 will engage flank 24 on thread 22. The interengaged flanks 13 and 23 and 14 and 24 will provide metal-to-metal seals along the thread length upon final make-up. Adjacent dove-tail threads 12 and 22 are intermediate threads 15 and 25 on the pin member and box member respectively. As will be appreciated, during makeup of the box and pin members, flank 17 of intermediate thread 15 will engage flank 27 of intermediate thread 25 and flank 18 of thread 15 will engage flank 28 of thread 25. Interengaged flanks 17 and 27 and 18 and 28 will also provide metal-to-metal seals along the thread length of the connection shown in FIG. 1.

As can be seen from FIG. 1, dove-tail threads 12 have negative flank angles. Such flank angles should be less than about 85 to enable the interengaged flanks to resist unscrewing of the connection. Intermediate threads 15 have positive flank angles. Thus, as illustrated in the embodiment shown in FIG. 1, between every two dove-tail threads, having negative flank angles, an intermediate thread, having positive flank angles, is introduced. In one embodiment, the intermediate thread is a modified buttress thread. Alternatively, the intermediate thread may be a buttress thread, an ACME thread, a round thread or other conventional oilfield threads. In a preferred embodiment, opposing flanks on adjacent threads on pin member 10 are parallel, such as flank 14 on dove-tail thread 12 and flank 17 on intermediate thread 15. Similarly, flank 18 of intermediate thread 15 is parallel to flank 13 of dove-tail thread 12. The opposing flanks of adjacent threads on box member 20 may also be parallel.

The dual threads will be machined in a manner such that when the intermediate threads 15 and 25 begin to engage, they will generate hoop tension in the box and hoop compression in the pin. When the dove-tail threads 12 and 22 begin to engage, they will do the opposite, meaning they will generate hoop compression in the box and hoop tension in the pin. Torque is resisted by the radial interference and the opposing forces generated by the two different types of threads. Because the opposing forces offset one another, at least to some degree, the combined hoop stress acting on the connection is reduced, thus allowing more torque to be trapped in the connection. The more torque that can be applied to the connection, the higher the torque capacity and the higher the resistance to backing off downhole.

The strain reactions to the torque are mainly radial. High torque is required to make-up the connection of the preferred embodiments. The resistance to make-up is due to the radial wedging created by the threads arrangement. External and/or internal shoulders may be used to improve sealing ability and to provide additional torque capacity. An external shoulder with a trapping angle is shown in FIG. 1 where shoulder 34 of pin member 10 engages shoulder 36 of box member 20. As discussed in more detail below, the threads arrangement may also incorporate axial wedging to further increase the torque capacity of the connection.

The connection may have secondary sealing shoulders 37 and 38 on the pin nose 11 and back of box member 20 respectively. After primary sealing shoulders 34 and 36 have engaged, additional torque may be applied to the connection to close gap 41. Thus, the secondary seal shoulders 37 and 38 may be activated after a predetermined amount of torque has been applied to the connection. The reverse angle of shoulders 37 and 38 will keep pin nose 11 from extending radially into the internal diameter of the connection.

Figure 4:
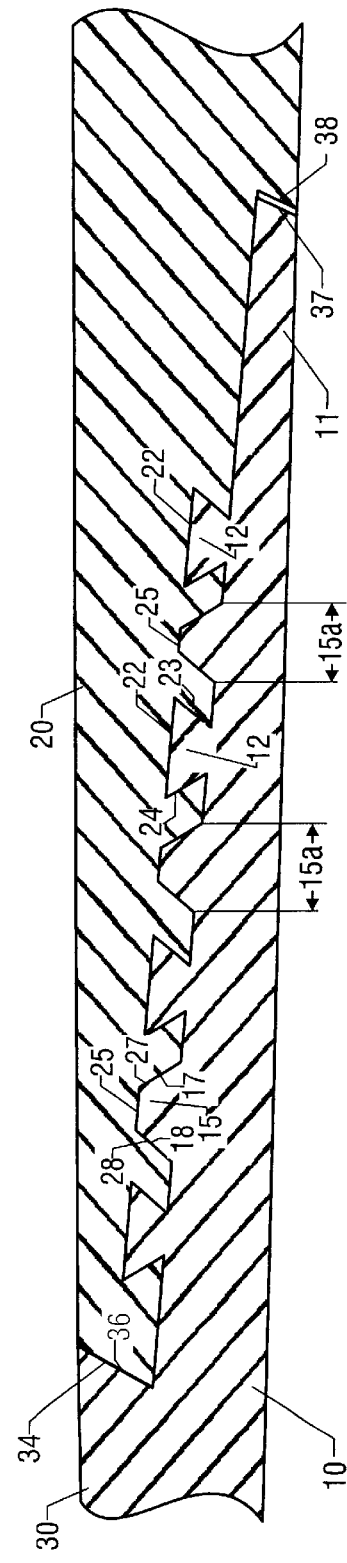
FIG. 4 is a side view of an embodiment of the threaded pipe connection wherein the intermediate thread increases in width along the helical length of the pin member.

In one embodiment, the base widths of both the intermediate and dove-tail threads are constant along the helical length of both the box and pin members. The connection illustrated in FIGS. 1 and 2 are examples of such an embodiment. However, to further increase the torque capacity of the connection, the dimensions of the dual threads may be configured to cause axial wedging between the mating threads on the box and pin members. One of skill will appreciate that there are various configurations, such as those described below, which will create such axial wedging. Referring to the embodiment of the invention shown in FIG. 4, the base of the intermediate threads 25 on the box member 20 will have an equal width along the box thread length and the base of each intermediate thread 15 on the pin member 10 will have a width 15a that is slightly wider than the preceding intermediate thread's base as the threads move away from the pin nose 11 towards the outside diameter of tube 30. Thus, the base width of the intermediate thread 15 will gradually increase along the helical length of the thread. One of skill will appreciate that FIG. 4 (as well as FIGS. 5 and 7) is shown with exaggerated dimensions to more clearly illustrate the described embodiment. By way of example, but not intended to be limiting in any way, the base width of intermediate thread 15 may increase by 0.0005 inches per thread along its helical length. This width may change depending on the subject pitch of the thread for any certain pipe diameter.

In an alternative embodiment, illustrated in FIG. 5, the base width 12a of the dove-tail thread 12 increases along the helical length of the pin member while the base width of the mating dove-tail thread 22 remains the same. One of skill will also appreciate that prior to complete make-up, there will be gaps (not shown) between the dove-tail threads on the pin and box members as the members are being screwed together. Similarly, there will be gaps between the intermediate threads in the embodiment shown in FIG. 4 when the connection is in the partially made-up condition.

The box threads may have a slightly smaller width than that of the corresponding mating pin threads to create more interference and to create more rigidity and higher torque capacity. By way of example, the width of the box threads may be 0.0005 inches per thread less than the corresponding mating pin threads. Thus, axially wedging may be obtained by having a constant base width for the intermediate threads of the pin member and box member but the base width of the mating thread on the box member is slightly smaller than the width of the corresponding thread on the pin member. Similarly, axial wedging may be achieved by having the base width of the dove-tail thread on the box being slightly less than the mating dove-tail thread on the pin member.

One useful application for the new tubular connection design is thin wall tubes such as used in expandable tubulars. Thin wall tubular threaded connections usually do not have strong shoulders to give the connection a high torque capacity. According to the present invention, the majority of the torque resistance is built into the threads of the connection and not in the shoulders thus giving thin wall connections a high torque capacity. An expander device, such as a rotary expander, is introduced into the inside diameter of the pipe during the expansion procedure. As the expansion takes place, the rotating device tends to rotate the pin into the box. Without sufficient high torque resistance, the pin will overrotate inside the box to a detrimental distance, thereby ruining the connection and possibly the pressure containing integrity of the wellbore. Tubular connections expanded by a non-rotating expanding means, such as a solid cone or swedge, may try to lift apart due to the bending forces imparted on the connection as expansion proceeds along the length of the connection. The dual threaded connection of the present invention provides increased torque resistance to thread back off and thread jumping during axial or radial movement, thus allowing a higher percentage of expansion.

The dual threaded connection of the present invention can be machined on plain end pipe, on upset ends or non-upset ends. The connection may be used as a coupled and threaded pipe connection, or as an integral pipe connection. Thus, it will be understood that box member 20 may be the box of an integral connection or one end of a coupling. The threaded pipe connection may be used on drill pipe tool joints, on casing, tubing, line pipe, wash pipe, completion tools and on other types of oilfield tubulars where a high torque capacity is needed. The threaded connection may be machined with a single lead, or a twin lead for faster make-up. Preferably, the dual threaded connection of the present invention is machined with a twin lead.

The threads sealing ability can be complemented with thread connection designs that will incorporate radial metal-to-metal seals, resilient non-metallic seals, torque shoulders and a combination of any of the above. FIG. 1 illustrates a resilient nonmetallic seal ring 57 located in a radial groove in box member 20. Seal ring 57 may be a Teflon® seal ring or an elastomeric seal ring. The connection may have a radial clearance or space between the mating crest and root of the intermediate and dove-tail threads for the box and pin member. FIG. 6 shows radial clearance 32 between dove-tail threads 12 and 22 and radial clearance 35 between intermediate threads 15 and 25. Such radial clearance serves as an exit route for excess pipe dope during make-up and will contain the compressed thread compound after proper make-up to improve the threads sealing ability. The size of the space or gap may be selected to control or decrease the hoop stress generated by forcible make-up of the connection. By way of example, the optimal radial clearance may be between about 0.002 inches and about 0.01 inches with a preferred clearance of about 0.004 inches.

This connection, based on the application it is designed for, can produce a tubular threaded connection with performance properties that can match that of the tube. This can be done on upset or expanded integral joints and on threaded and coupled connections designs.

The connection can be machined on taper, straight or stepped. FIGS. 1, 2 and 3 illustrate examples of tapered, straight and stepped connections utilizing the present invention. By way of example, the connections of the present invention may be machined with six threads per inch with a 1⅛ inch taper per foot. One of skill in the art will appreciate, however, that the thread pitch and the amount of taper or profile of the step as illustrated are not meant to be limiting and may vary without departing from the invention.

FIG. 8 illustrates a variation of an embodiment of the present invention which includes a recessed area 39 adjacent pin nose 11 when the connection is in the fully 18 made-up position. Recess 39 allows the pin to expand into the recess during the expansion operation where the pin may tend to elongate and push against the back of the box. Couplings are known to have shrunk during the expansion operation. FIG. 8 also shows an alternative embodiment of a radial metal-to-metal shoulder seal between shoulders 34 and 36.

Ease of stabbing is a requirement in many applications. Such applications will include, but are not limited to wash pipe, liners, tubing, casing, drill pipe, etc. It is a very desirable feature in premium tubular connections.

Figure 9:
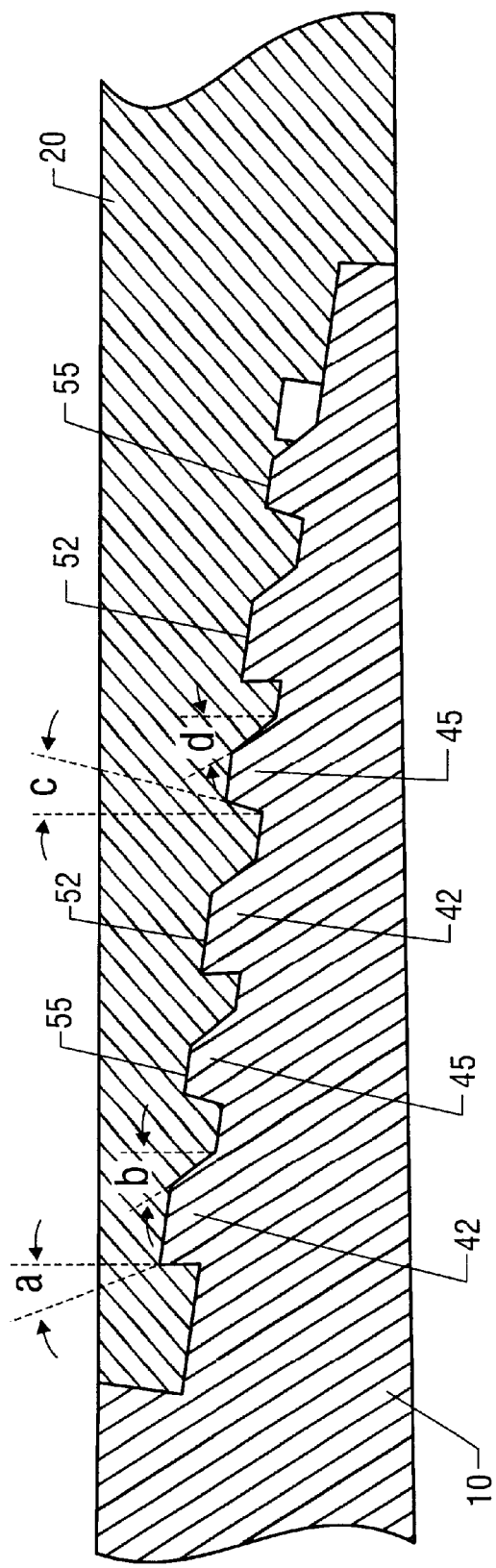
FIG. 9 is a side view of an embodiment of the threaded pipe joint connection with hooked threads.

In another embodiment of the invention shown in FIG. 9, the threads adjacent to the intermediate threads are hooked threads instead of dove-tail threads. Hooked threads will also tend to generate compression hoop stress in the box and tensile hoop stress in the pin upon make-up and reduce the possibility of thread jump out due to heavy axial loads. The intermediate thread, such as modified buttress threads, ACME threads, or round threads will do the opposite thus creating a situation where the combined hoop stress acting on the connection is reduced, thereby allowing more torque to be trapped in the connection.

In the embodiment shown in FIG. 9, thread 42 has a negative (hooked) load angle (a) of about 10 degrees. Its stab angle (b) has a positive angle of about 45 degrees. Thread 45 has a positive load angle (c) of about 10 degrees and a stab angle (d) of about 45 degrees. The fact that both types of threads have equal and steep stab angles, for example between about 30–45 degrees, will facilitate stabbing and make-up and will reduce the possibility of thread crossing. The above angles arrangement is for demonstration purposes only and should not limit the use of other combination of different angles as long as one load angle is negative (hooked) and that the load angle for the adjacent thread is positive and that both the stab angles for both the adjacent threads are relatively steep angles ranging from about 25 to 50 degrees. The stab angles (b) and (d) preferably are equal, but embodiments with different stab angles may be used without departing from the invention. The load flank on thread 42 is negative and preferably between about 3 degrees and about 10 degrees. The stab angle for thread 42 is positive and preferably between about 30 degrees and about 45 degrees. Thread 45 preferably has a positive load flank between about 3 degrees and about 10 degrees and a stabbing flank having positive load angle between about 30 degrees and about 45 degrees. The optimum arrangement of the angles will give the designer a controlled range of hoop stress and a desired torque capacity.

The dual thread arrangement as shown in FIG. 9, will generate hoop stresses in opposing directions due the engagement of mating threads. This arrangement will build a higher torque capacity in the connection and thus creating the need for higher make-up torque to fully make the connection.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A threaded pipe connection having box and pin members comprising:
   interengageable thread means on the box and pin members, the thread means including a dove-tail thread having negative flank angles extending along the lengths of the box and pin members;
   an intermediate thread having positive flank angles extending along the lengths of the box and pin members adjacent the dove-tail thread;
   wherein the intermediate thread generates hoop tension in the box member and hoop compression in the pin member, and the dove-tail thread generates hoop compression in the box member and hoop tension in the pin member during engagement of the pin member with the box member.

2. The threaded pipe connection of claim 1 wherein the adjacent flanks of the dove-tail thread and intermediate thread are parallel.

3. The threaded pipe connection of claim 1 wherein the base width of the intermediate thread of the box member is substantially the same along the length of the box member.

4. The threaded pipe connection of claim 1 wherein the base width of each intermediate thread on the pin member gradually increases along the length of the pin member.

5. The threaded pipe connection of claim 3 wherein the base width of each intermediate thread on the pin member gradually increases along the length of the pin member.

6. The threaded pipe connection of claim 1 wherein the base width of the dove-tail thread of the box member is substantially the same along the length of the box member.

7. The threaded pipe connection of claim 1 wherein the base width of each dove-tail thread on the pin member gradually increases along the length of the pin member.

8. The threaded pipe connection of claim 1 wherein the base width of each dove-tail thread on the pin member gradually increases along the length of the pin member.

9. The threaded connection of claim 1 wherein the base width of the intermediate thread of the pin member is larger than the base width of the mating intermediate thread of the box member.

10. The threaded connection of claim 1 wherein the base width of the dove-tail thread of the pin member is larger than the base width of the mating dove-tail thread of the box member.

11. The threaded pipe connection of claim 1 wherein the intermediate thread is a modified buttress thread.

12. The threaded pipe connection of claim 1 wherein the intermediate thread is selected from a buttress thread, ACME thread, or round thread.

13. The threaded pipe connection of claim 1 wherein the intermediate thread resists back-off during radial expansion of the connection.

14. The threaded pipe connection of claim 1 wherein the box member and the pin member have a stepped profile.

15. The threaded pipe connection of claim 1 wherein the threaded pipe connection connects drillpipe, tubing, casing or washpipe joints.

16. The threaded pipe connection of claim 1 further comprising a radial clearance for pipe dope between the crest of the intermediate thread on the pin member and the root of the intermediate thread on the box member.

17. The threaded pipe connection of claim 1 further comprising a radial clearance for pipe dope between the crest of the dove-tail thread on the pin member and the root of the dove-tail thread on the box member.

18. The threaded pipe connection of claim 1 further comprising a resilient seal ring in the box member.

19. The threaded pipe connection of claim 18 wherein the seal ring is a Teflon® seal ring.

20. The threaded pipe connection of claim 18 wherein the seal ring is an elastomeric seal ring.

21. The threaded pipe connection of claim 1 further comprising a reverse angle shoulder seal between the pin member and the box member.

22. The threaded pipe connection of claim 1 wherein the connection may be upset or nonupset.

23. The threaded pipe connection of claim 1 further comprising metal-to-metal seals between the mating flanks of the dove-tail thread on the box and pin members.

24. The threaded pipe connection of claim 1 further comprising metal-to-metal seals between the mating flanks of the intermediate thread on the box and pin members.

25. A threaded pipe connection comprising:
   a dual threaded pin member having a tapered, external, generally dove-tail shaped thread having negative flank angles and a tapered, external intermediate thread having positive flank angles adjacent the generally dove-tail shaped thread;

a dual threaded box member having a tapered, internal, generally dove-tail shaped mating thread engageable with the generally dove-tail shaped thread of the pin member and a tapered, internal intermediate mating thread engageable with the intermediate thread of the pin member so that the respective generally dove-tail shaped thread and intermediate thread of the pin member engage the respective mating threads of the box member during rotational makeup of the connection.

26. The threaded pipe connection of claim 25 wherein the adjacent flanks of the dove-tail thread and intermediate thread are parallel.

27. The threaded pipe connection of claim 25 wherein the base width of the intermediate thread of the box member is substantially the same along the length of the box member.

28. The threaded pipe connection of claim 27 wherein the base width of each intermediate thread on the pin member gradually increases along the length of the pin member.

29. The threaded pipe connection of claim 25 wherein the base width of each intermediate thread on the pin member gradually increases along the length of the pin member.

30. The threaded pipe connection of claim 25 wherein the base width of the dove-tail thread of the box member is substantially the same along the length of the box member.

31. The threaded pipe connection of claim 25 wherein the base width of each dove-tail thread on the pin member gradually increases along the length of the pin member.

32. The threaded pipe connection of claim 30 wherein the base width of each dove-tail thread on the pin member gradually increases along the length of the pin member.

33. The threaded connection of claim 25 wherein the base width of the intermediate thread of the pin member is larger than the base width of the mating intermediate thread of the box member.

34. The threaded connection of claim 25 wherein the base width of the dove-tail thread of the pin member is larger than the base width of the mating dove-tail thread of the box member.

35. The threaded pipe connection of claim 25 wherein the intermediate thread is a modified buttress thread.

36. The threaded pipe connection of claim 25 wherein the intermediate thread is selected from a buttress thread, ACME thread, or round thread.

37. The threaded pipe connection of claim 25 wherein the box member and the pin member have a stepped profile.

38. The threaded pipe connection of claim 25 further comprising a radial clearance for pipe dope between the crest of the intermediate thread and the dove-tail thread on the pin member and the root of the intermediate thread and the dove-tail thread on the box member.

39. The threaded pipe connection of claim 25 further comprising a twin lead for initiating engagement between the pin member and the box member.

40. A pipe connection having a box member and a pin member with interengageable threads comprising:
   a first thread profile which generates hoop tension in the box member and hoop compression in the pin member during make-up of the connection and
   a second thread profile adjacent the first thread profile which generates hoop compression in the box member and hoop tension in the pin member during make-up of the connection.

41. The pipe connection of claim 40 wherein the second thread profile has a generally dove-tail shape.

42. The pipe connection of claim 40 wherein the second thread profile has a negative load angle.

43. The pipe connection of claim 42 wherein the second thread profile has a positive stab angle.

44. The pipe connection of claim 42 wherein the negative load angle is between about 3 degrees and about 10 degrees.

45. The pipe connection of claim 43 wherein the positive stab angle is between about 30 degrees and about 45 degrees.

46. The pipe connection of claim 40 wherein the interengageable threads includes a reservoir for pipe dope comprising a radial clearance between the mating crests and roots of the first and second threads profiles on the box and pin members.

47. The pipe connection of claim 40 wherein the first thread profile on the pin member is configured to create axial wedging with the interengageable first thread profile on the box member.

48. The pipe connection of claim 40 wherein the second thread profile on the pin member is configured to create axial wedging with the interengageable second thread profile on the box member.

49. The pipe connection of claim 40 wherein the opposing hoop stresses generated by the first and second threads profiles reduce the combine combined hoop stress acting on the connection.

50. The pipe connection of claim 40 wherein the first thread profile is a buttress thread, an ACME thread or a round thread.

51. The pipe connection of claim 40 wherein the second thread profile generates radial and axial wedging along the length of the connection upon final make-up of the connection.

* * * * *

UNITED STATES PATENT AND TRADEMARK OFFICE
CERTIFICATE OF CORRECTION

PATENT NO. : 6,767,035 B2  Page 1 of 1
DATED : July 27, 2004
INVENTOR(S) : Ghazi J. Hashem It is certified that error appears in the above-identified patent and that said Letters Patent is hereby corrected as shown below:

Column 8,
Line 13, replace "1" with -- 6 --.

Column 10,
Lines 28 and 39, replace "threads" with -- thread --.
Line 40, delete "combine".

Signed and Sealed this

Twenty-first Day of September, 2004

JON W. DUDAS
*Director of the United States Patent and Trademark Office*